June 1, 1926.
R. J. WADD ET AL
1,587,259
HOISTING
Filed May 14, 1924
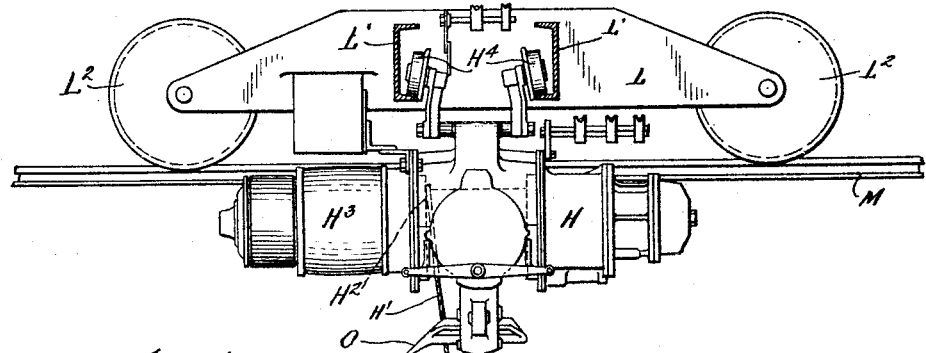
Fig.1,
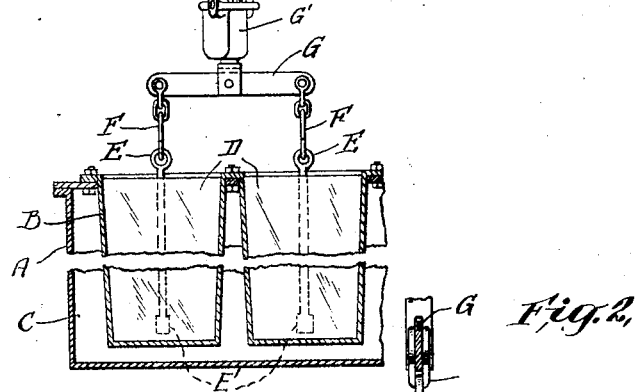
Fig.2,
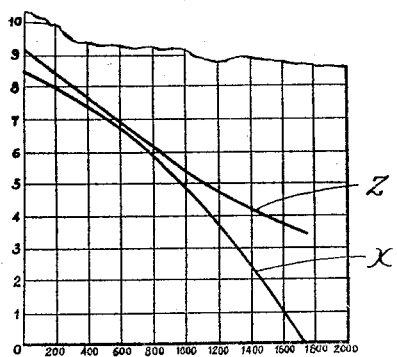
Fig.3,
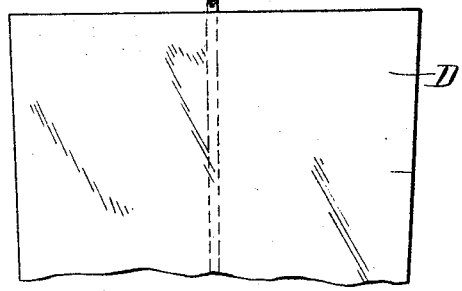
Inventors
Roy J. Wadd and
Edward J. Parvin
By their Attorney
John E. Hubbell Patented June 1, 1926.

1,587,259

UNITED STATES PATENT OFFICE.

ROY J. WADD, OF MONTOUR FALLS, NEW YORK, AND EDWARD G. PARVIN, OF ROSELLE, NEW JERSEY, ASSIGNORS TO SHEPARD ELECTRIC CRANE & HOIST COMPANY, OF MONTOUR FALLS, NEW YORK, A CORPORATION OF NEW YORK.

HOISTING.

Application filed May 14, 1924. Serial No. 713,164.

In a known method of manufacturing ice now coming into use, cakes or blocks of ice are formed by the congelation of water in cans dipping into a brine bath suitably cooled to freeze the water, and after the ice cakes are formed the brine is heated up sufficiently to thaw the ice blocks loose from cans whereupon the ice blocks are removed from the cans which remain permanently in the brine tank instead of being removed from the latter to permit the discharge of the ice as has heretofore been the usual practice. The period of time required for thawing an ice cake loose from the walls of the can in which it is formed, varies with conditions and not infrequently amounts to a half hour or so. Each ice cake thus formed ordinarily weighs several hundred pounds and its removal is best effected by means of an overhead hoist mounted on a traveling crane, the hoist ordinarily being attached to the ice cake by connecting the hoist hook to an eye-bolt frozen into the ice cake.

The object of the present invention is to provide an improved method of removing ice cakes from the stationary cans in which they are formed. To remove an ice cake in accordance with the present invention, we employ a hoist driven by a suitable and suitably energized electric motor and attach the hoist hook to an ice cake, or to a plurality of ice cakes which are to be simultaneously removed, at any convenient time after the ice cake or cakes are formed and before they are thawed loose from the cans in which they are formed, and then energize the motor and maintain its energization until the ice cake or cakes thaw loose, whereupon the hoist lifts the cake or cakes out of the cans. For the purposes of our invention, the hoist motor employed must be of such character and be connected into such an energizing circuit that when the motor is energized, its torque will be ample to lift the weight of the cake or cakes of ice which it is to draw out of the cans, and will not be great enough to subject the cans or ice cakes to undue strain while the ice cakes are still frozen to the walls of the cans, and the motor itself will not be overheated or otherwise injured by the maintenance of its energization during the period of 30 minutes or so in which the motor is held stationary while the cake or cakes of ice are being thawed loose from the cans. No special or unusual form of electric motor is required for this purpose as some existing motors are well adapted for this service and require no, or a relatively small amount of external resistance to prevent an undesirably large current flow through the motor.

The various features of novelty which characterize our invention are pointed out with particularity in the claims annexed to and forming a part of this specification. For a better understanding of the invention, however, reference should be had to the accompanying drawings and descriptive matter in which we have illustrated and described suitable apparatus for carrying out our invention.

Of the drawings:

Fig. 1 is a somewhat diagrammatic view partly in section of an ice making plant;

Fig. 2 is an elevation taken at right angles to Fig. 2; and

Fig. 3 is a diagram illustrating characteristics of a suitable hoist motor.

In the drawings A represents the brine tank of an ice making plant with stationary cans B for the water to be frozen into ice cakes which dip into the brine space C in the tank A. Each ice cake D formed in a can B has incorporated in it a lifting element E shown as an eye-bolt, the head of which is above the top of the ice cake and the lower end of which may be enlarged as indicated in E' to increase the strength of the connection between the eye-bolt and the ice cake in which it is frozen. To remove an ice cake D from the can B in which it is formed, the corresponding eye-bolt E is engaged by a hoisting hook F. As shown, the hoisting mechanism is intended to simultaneously lift two ice cakes D out of the cans in which they are formed, though it is to be understood that one, or more of two ice cakes may be removed from the cans at a single time. To provide for the simultaneous removal of two ice blocks D, the hoisting mechanism shown in the drawings is provided with two lifting hooks F connected by a bar G to the hoist pulley G'. The latter is supported by the hoist rope or cable H' which has one end connected to the hoisting drum $H^2$ of an electric hoist H which comprises a suitable motor $H^3$ for operating the drum $H^2$. Aside from the requirement for a motor $H^3$ having proper characteristics for the present purpose, the hoist H may be of standard construction. As shown, the hoist H comprises supporting wheels H⁴ running along the track rails L' forming a part of the framework of an overhead traveling crane L, the wheels L² of which run on supporting rails M transverse to the rails L'. The hoist H may have the usual control and brake provisions, and in particular should be provided with controlling provisions for interrupting the hoisting movement of the drum H² when the pulley G' reaches the desired upward limit of its travel. As control provisions suitable for this purpose including an actuating part O engaged by the pulley G when the latter approaches the desired upper limit of its movement, are well known and in common use no necessity is seen for illustrating or describing such provisions in detail herein.

A polyphase induction motor with slip ring connections and other known forms of electric motors are well adapted for use as the hoist motor H³. The essential requirement with respect to the hoist motor H³ is that the motor by reason of its construction, its mode of energization and energizing circuit connections including whatever external resistances may be necessary, shall have the proper characteristics for the intended service. Suitable characteristics for a motor for this service are indicated in Fig. 3 wherein Z is a curve representing the strength of the motor energizing current, and X is a curve representing the motor torque in a diagram wherein the ordinates represent both amperes and torque foot pounds, and the abscissæ represent motor speed. With a motor having the characteristics illustrated in Fig. 3, its torque is a maximum at the time of starting and decreases more or less gradually as the motor starts into operation and speeds up. The motor should be of a character which would prevent it from being injured by overheating or otherwise when continuously energized for the maximum period required for thawing the ice cake or ice cakes to which the hoist is connected loose from the corresponding cans B. This period, at a maximum, will not ordinarily exceed a half hour or so. The motor should be of such character that the maximum lifting effect of the hoist will be somewhat in excess of the weight of the ice cake or cakes to be lifted out of the cans in one operation, and will be small enough to prevent injury to the ice blocks D or the cans B, when the hoist is attached to the ice blocks and the motor H³ energized while the ice blocks are frozen to the cans.

In the use of the invention, the hoist may be connected to the ice cake or cakes to be removed from the cans and the hoist motor H³ energized at, or any convenient time after, the ice is formed, and the energization of the motor H³ is then maintained until the ice blocks thaw loose from the cans and are lifted above the latter. The use of the invention reduces the labor cost of operation of the ice plant as a whole, and reduces the care and attention which must be given to the operation of removing the ice from the cans since, with the invention, the ice is removed from the cans at exactly the proper moment, namely, the moment at which the blocks thaw loose from the cans thus avoiding all tendency to the undue thawing of the ice cakes which results from leaving the cakes D in the cans B while the latter are in contact with brine which is then warmer than the ice. Apparatus constructed, arranged and operated as herein disclosed, may be employed in lifting any weight which it is desirable to lift only after an initial restraining force has diminished.

Having now described our invention, what we claim as new and desire to secure by Letters Patent, is:—

1. The method of removing blocks of ice from stationary cans in which they are formed, which consists in connecting one or more ice blocks, while each is still frozen to the can in which it is formed, to a hoisting mechanism operated by an electric motor adapted to be held stationary without injury to itself throughout the period required for the ice blocks to thaw loose from the cans, while energized to exert a hoist lifting force exceeding the weight of the attached block or blocks of ice but insufficient to impress an undue stress on the ice, and so energizing said motor.

2. The method of lifting a body initially subjected to a restraining force subsequently diminishing which consists in connecting the body while said force is relatively large to a hoisting mechanism operated by an electric motor adapted to be held stationary without injury to itself throughout the period required for said force to diminish while energized to exert a hoist lifting force exceeding the weight of said body but less than the sum of said weight and said restraining force, and so energizing said motor.

Signed at Montour Falls, in the county of Schuyler and State of New York, this 10th day of May, A. D. 1924.

ROY J. WADD.

Signed at Roselle, in the county of Union and State of New Jersey, this 12th day of May, A. D. 1924.

EDWARD G. PARVIN.